(12) United States Patent
Watanabe et al.

(10) Patent No.: US 9,242,557 B2
(45) Date of Patent: Jan. 26, 2016

(54) ACCELERATOR APPARATUS FOR VEHICLE

(71) Applicant: DENSO CORPORATION, Kariya, Aichi-pref. (JP)

(72) Inventors: Hidekazu Watanabe, Aichi-gun (JP); Masahiro Makino, Kariya (JP)

(73) Assignee: DENSCO CORPORATION, Kariya (JP)

( * ) Notice: Subject to any disclaimer, the term of this patent is extended or adjusted under 35 U.S.C. 154(b) by 252 days.

(21) Appl. No.: 14/091,363

(22) Filed: Nov. 27, 2013

(65) Prior Publication Data

US 2014/0145713 A1    May 29, 2014

(30) Foreign Application Priority Data

Nov. 28, 2012    (JP) ................................. 2012-259642

(51) Int. Cl.
*G01B 7/30* (2006.01)
*B60K 26/02* (2006.01)
*G01D 5/14* (2006.01)

(52) U.S. Cl.
CPC ........... *B60K 26/02* (2013.01); *F02D 2200/602* (2013.01); *G01D 5/145* (2013.01); *Y10T 74/20534* (2015.01)

(58) Field of Classification Search
CPC .................... F02D 2200/602; Y10T 74/20534
USPC ...................................... 324/207.25
See application file for complete search history.

(56) References Cited

U.S. PATENT DOCUMENTS

| | | | | |
|---|---|---|---|---|
| 5,544,000 | A | * | 8/1996 | Suzuki et al. ................. 361/139 |
| 8,925,418 | B2 | * | 1/2015 | Saito et al. ...................... 74/513 |
| 2004/0060542 | A1 | * | 4/2004 | Wayama et al. .............. 123/399 |
| 2012/0291586 | A1 | | 11/2012 | Watanabe et al. |

FOREIGN PATENT DOCUMENTS

JP        4198544        10/2008

* cited by examiner

*Primary Examiner* — Reena Aurora
(74) *Attorney, Agent, or Firm* — Nixon & Vanderhye P.C.

(57) ABSTRACT

When a rotational angle of a pedal is in a range from an angle of zero degrees to a predetermined rotational angle, which is larger than a full-opening-time rotational angle, a first Hall IC outputs a first voltage, which is twice larger than a second voltage outputted from a second Hall IC. When the rotational angle of the pedal is larger than the predetermined angle, the first Hall IC outputs a predetermined constant voltage. When an output difference, which is computed based on the first voltage and the second voltage, is equal to or smaller than a second threshold value, an abnormality of the sensed rotational angle of the pedal is determined.

8 Claims, 10 Drawing Sheets

ACCELERATOR APPARATUS FOR VEHICLE

CROSS REFERENCE TO RELATED APPLICATION

This application is based on and incorporates herein by reference Japanese Patent Application No. 2012-259642 filed on Nov. 28, 2012.

TECHNICAL FIELD

The present disclosure relates to an accelerator apparatus for a vehicle.

BACKGROUND

In an accelerator apparatus, which controls an acceleration state of a vehicle in response to the amount of depression of a pedal that is depressed by a foot of a driver of the vehicle, a rotational angle of the pedal is sensed with a rotational angle sensor. In the rotational angle sensor, each of magnetic flied sensing devices, which are rotatable relative to a magnetic field generating device installed to a shaft, converts a change in a magnetic flux density, into a voltage. In the accelerator apparatus, a valve opening degree of a throttle valve is controlled based on a rotational angle of the pedal, which is computed according to the converted voltage. For example, JP4198544B2 recites an accelerator apparatus, which includes a battery voltage sensing device and a sensor power source voltage sensing device and limits placement of the throttle valve into a full-closing state caused by decreasing of the voltages outputted from the two magnetic field sensing devices at the time of decreasing the electric power supplied to the two magnetic field sensing devices.

In the accelerator apparatus of JP4198544B2, it is determined whether the operation of the accelerator apparatus is normal based on a voltage difference, which is computed based on the two voltages outputted from the two magnetic field sensing devices, respectively. In an abnormal state of this accelerator apparatus where the pedal is further rotated from an accelerator-full-opening time position of the pedal in an accelerator opening direction due to, for example, forced deformation of the pedal, the voltage difference is within a predetermined normal range, in which the operation of the accelerator apparatus is determined to be normal, so that the sensed rotational angle of the pedal is not determined as abnormal.

SUMMARY

The present disclosure is made in view of the above points.

According to the present disclosure, there is provided an accelerator apparatus for a vehicle, including a support member, a shaft, a manipulation member, an urging device, a magnetic field generating device, a plurality of magnetic field sensing devices and an abnormality determining device. The support member is installable to a body of the vehicle. The shaft is rotatably supported by the support member. The manipulation member is fixed to an outer peripheral wall of the shaft and is rotatable integrally with the shaft. The urging device urges the shaft to rotate the shaft in an accelerator closing direction. The magnetic field generating device is installed to one of the shaft and the manipulation member. Each of the plurality of magnetic field sensing devices outputs a voltage, which corresponds to a change in a density of a magnetic flux that occurs at a time of rotating the magnetic field generating device relative to the plurality of magnetic field sensing devices. The abnormality determining device determines whether a sensed rotational angle of the magnetic field generating device relative to the plurality of magnetic field sensing devices is abnormal based on the voltages, which are outputted from the plurality of magnetic field sensing devices. A relationship between the voltage, which is outputted from one of the plurality of magnetic field sensing devices, and the voltage, which is outputted from another one of the plurality of magnetic field sensing devices, satisfies a predetermined condition when the sensed rotational angle of the magnetic field generating device relative to the plurality of magnetic field sensing devices is in a range from a full-closing-time rotational angle, which is a rotational angle of the magnetic field generating device relative to the plurality of magnetic field sensing devices at an accelerator-full-closing time, to a predetermined rotational angle that is positioned on one side of a full-opening-time rotational angle, which is opposite from the full-closing time rotational angle in an accelerator opening direction, wherein the full-opening-time rotational angle is a rotational angle of the magnetic field generating device relative to the plurality of magnetic field sensing devices at an accelerator-full-opening time. The one of the plurality of magnetic field sensing devices outputs the voltage, which is different from a voltage of the one of the magnetic field sensing devices computed according to the predetermined condition, when the sensed rotational angle of the magnetic field generating device relative to the plurality of magnetic field sensing devices is on one side of the predetermined rotational angle, which is opposite from the full-opening-time rotational angle in the accelerator opening direction. The abnormality determining device determines that the sensed rotational angle of the magnetic field generating device relative to the plurality of magnetic field sensing devices is abnormal when a voltage difference, which is computed based on the voltage outputted from the one of the plurality of magnetic field sensing devices and the voltage outputted from the another one of the plurality of magnetic field sensing devices, is equal to or larger than a first threshold value or is equal to or smaller than a second threshold value. The second threshold value is smaller than the first threshold value.

Furthermore, according to the present disclosure, there is also provided an accelerator apparatus for a vehicle, including a support member, a shaft, a manipulation member, an urging device, a magnetic field generating device, a plurality of magnetic field sensing devices and an abnormality determining device. The support member is installable to a body of the vehicle. The shaft is rotatably supported by the support member. The manipulation member is fixed to an outer peripheral wall of the shaft and is rotatable integrally with the shaft. The urging device urges the shaft to rotate the shaft in an accelerator closing direction. The magnetic field generating device is installed to one of the shaft and the manipulation member. Each of the plurality of magnetic field sensing devices outputs a voltage, which corresponds to a change in a density of a magnetic flux that occurs at a time of rotating the magnetic field generating device relative to the plurality of magnetic field sensing devices. The abnormality determining device determines whether a sensed rotational angle of the magnetic field generating device relative to the plurality of magnetic field sensing devices is abnormal based on the voltages, which are outputted from the plurality of magnetic field sensing devices. A relationship between the voltage, which is outputted from one of the plurality of magnetic field sensing devices, and the voltage, which is outputted from another one of the plurality of magnetic field sensing devices, satisfies a predetermined condition when the sensed rotational angle of the magnetic field generating device relative to the plurality of magnetic field sensing devices is in a range from a full-closing-time rotational angle, which is a rotational angle of the magnetic field generating device relative to the plurality of magnetic field sensing devices at an accelerator-full-closing time, to a full-opening-time rotational angle, which is a rotational angle of the magnetic field generating device relative to the plurality of magnetic field sensing devices at an accelerator-full-opening time. The one of the plurality of magnetic field sensing devices outputs the voltage, which is different from a voltage of the one of the magnetic field sensing devices computed according to the predetermined condition, when the sensed rotational angle of the magnetic field generating device relative to the plurality of magnetic field sensing devices is on one side of the full-opening-time rotational angle, which is opposite from the full-closing-time rotational angle in an accelerator opening direction. The abnormality determining device determines that the sensed rotational angle of the magnetic field generating device relative to the plurality of magnetic field sensing devices is abnormal when a voltage difference, which is computed based on the voltage outputted from the one of the plurality of magnetic field sensing devices and the voltage outputted from the another one of the plurality of magnetic field sensing devices, is equal to or larger than a first threshold value or is equal to or smaller than a second threshold value. The second threshold value is smaller than the first threshold value.

BRIEF DESCRIPTION OF THE DRAWINGS

The drawings described herein are for illustration purposes only and are not intended to limit the scope of the present disclosure in any way.

DETAILED DESCRIPTION

Figure 1:
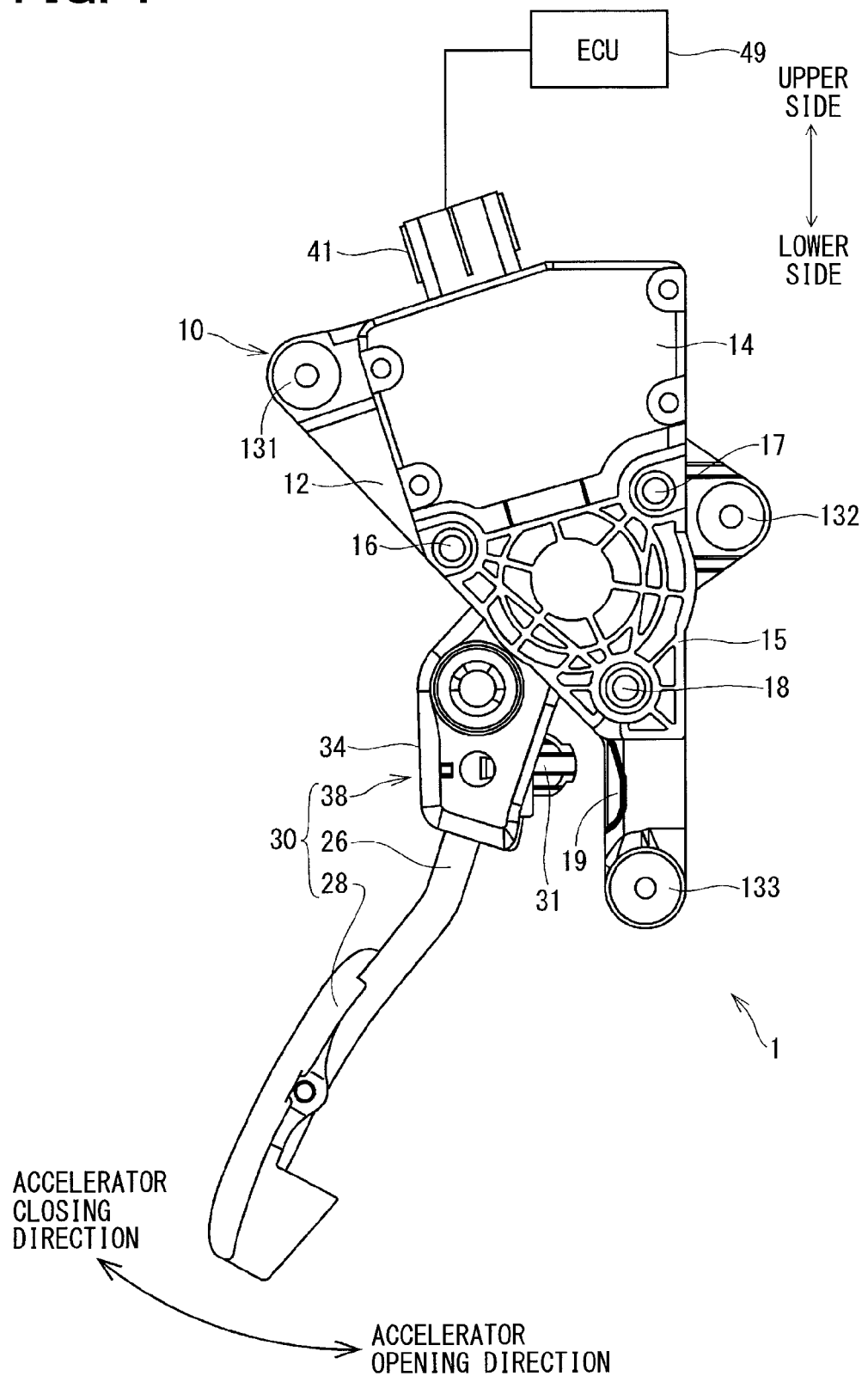
FIG. 1 is a lateral view of an accelerator apparatus according to a first embodiment of the present disclosure.

Various embodiments of the present disclosure will be described with reference to the accompanying drawings.

First Embodiment

An accelerator apparatus according to a first embodiment of the present disclosure will be described with reference to FIGS. 1 to 5B. The accelerator apparatus 1 is an input apparatus, which is manipulated by a driver of a vehicle (e.g., an automobile) to determine a valve opening degree of a throttle valve of an internal combustion engine of the vehicle. The accelerator apparatus 1 is an electronic accelerator apparatus that transmits an electrical signal, which indicates an amount of depression of an accelerator pedal 28, to an electronic control unit (also referred to as an electronic control device) of the vehicle. The electronic control unit of the vehicle drives the throttle valve through a throttle actuator (not shown) based on the amount of depression of the accelerator pedal 28 and the other information.

The accelerator apparatus 1 includes a support member 10, a shaft 20, a manipulation member 30, a return spring 39, a rotational angle sensor 40, an electronic control unit (ECU) 49 and a hysteresis mechanism 50. In the following description, an upper side of FIGS. 1 to 3 will be described as an upper side of the accelerator apparatus 1, and a lower side of FIGS. 1 to 3 will be described as a lower side of the accelerator apparatus 1.

The support member 10 includes a housing 12, a first cover 14 and a second cover 15. The support member 10 forms an inside space 11, which receives the shaft 20, the return sprig 39, the rotational angle sensor 40 and the hysteresis mechanism 50. A communication hole 111 is formed at a lower portion of the support member 10 to communicate between the inside space 11 of the support member 10 and an outside space of the support member 10. A size of the communication hole 111 corresponds to a movable range of the manipulation member 30, which will be described later.

The housing 12 is made of a resin material and includes a bearing segment 13, a front segment 122, a rear segment 123 and a top segment 121. The bearing segment 13 rotatably supports one end portion 201 of the shaft 20. The front segment 122 is connected to the bearing segment 13 and is located at a front side of the accelerator apparatus 1. The rear segment 123 is opposed to the front segment 122. The top segment 121 is located at the top side of the accelerator apparatus 1 and connects the bearing segment 13, the front segment 122 and the rear segment 123 together. Protrusions and recesses, which are configured into a mesh pattern, are formed in an outer wall of the bearing segment 13, an outer wall of the front segment 122, an outer wall of the rear segment 123 and an outer wall of the top segment 121 to maintain the resistivity against an external force applied to the housing 12.

The bearing segment 13 has an opening, which receives the one end portion 201 of the shaft 20, and the one end portion 201 of the shaft 20 is rotatably received in this opening of the bearing segment 13. Specifically, the inner wall of the opening of the bearing segment 13 forms a bearing 130, which rotatably supports the one end portion 201 of the shaft 20.

As shown in FIG. 1, installation portions 131-133 are formed in the housing 12. A bolt hole is formed in each of the installation portions 131-133. The accelerator apparatus 1 is installed to a body (also referred to as a vehicle body) 5 of the vehicle by bolts, which are received through the bolt holes, respectively, of the installation portions 131, 132, 133.

A full-opening-side stopper portion 19, which is a recess, is formed in the lower side of the rear segment 123. In a normal state of the accelerator apparatus, when a full-opening-side stopper 31, which is formed as a protrusion in the manipulation member 30, contacts the full-opening-side stopper portion 19, a rotational angle of the manipulation member 30 is limited at an accelerator-full-opening position. The accelerator-full-opening position is a position, at which the amount of depression of the manipulation member 30 by the driver is in the full amount, i.e., an accelerator opening degree (an opening degree of the accelerator) is 100% (full opening).

The first cover 14 and the second cover 15 are generally parallel to the bearing segment 13 of the housing 12.

The first cover 14 is configured into a rectangular plate form. The first cover 14 is engaged to the second cover 15 such that the first cover 14 contacts an end portion of the top segment 121, an end portion of the rear segment 123 and an end portion of the front segment 122, which are opposite from the bearing segment 13. The first cover 14 limits intrusion of foreign objects into the inside space 11.

The second cover 15 is configured into a triangular plate form. The second cover 15 is fixed to an end portion of the rear segment 123 and an end portion of the front segment 122, which are opposite from the bearing segment 13, with screws 16, 17, 18. A recess is formed in the inner wall of the inside space 11 of the second cover 15 to rotatably receive the other end portion 202 of the shaft 20, which is opposite from the one end portion 201. Specifically, the inner wall of the recess forms a bearing 150, which rotatably supports the other end portion 202 of the shaft 20. The second cover 15 limits intrusion of foreign objects into the inside space 11.

The shaft 20 extends in a horizontal direction (a left-to-right direction of the vehicle) at the lower side of the accelerator apparatus 1. A sensor receiving recess 22 is formed in the one end portion 201 of the shaft 20 to receive a corresponding device of the rotational angle sensor 40. Specifically, a yoke 42, which is made of a magnetic material and is configured into a tubular form, is fixed to the inner wall of the sensor receiving recess 22. Two permanent magnets 44, 45, which have opposite polarities relative to each other, are installed to the inner peripheral wall of the yoke 42 such that the magnets 44, 45 are opposed to each other about a rotational axis of the shaft 20. The magnets 44, 45 serve as a magnetic field generating device (also referred to as a magnetic field generating means).

Normally, the shaft 20 is rotatable through a predetermined angular range from an accelerator-full-closing position (a rotational position of the shaft 20 at an accelerator-full-closing time, at which the throttle valve is placed in its predetermined fully closed position) to an accelerator-full-opening position (a rotational position of the shaft 20 at an accelerator-full-opening time, at which the throttle valve is placed in its predetermined fully opened position) in response to a torque, which is applied from the manipulation member 30 upon depressing of the manipulation member 30 by a foot of the driver. The accelerator-full-closing position is a position (see a solid line in FIG. 2), at which the amount of depression of the manipulation member 30 by the foot of the driver is zero, i.e., the accelerator opening degree is 0% (full closing).

Hereinafter, the rotational direction of the manipulation member 30 from the accelerator-full-closing position toward the accelerator-full-opening position will be referred to an accelerator opening direction. Furthermore, the rotational direction of the manipulation member 30 from the accelerator-full-opening position toward the accelerator-full-closing position will be referred to an accelerator closing direction.

The manipulation member 30 includes a rotatable body 38, an accelerator pedal 28 and a pedal arm 26. The rotatable body 38 includes a boss portion 32, an arm connecting portion 34, a spring receiving portion 35 and a full-closing-side stopper portion 36, which are formed integrally.

The boss portion 32 is configured into an annular form (i.e., a cylindrical tubular form) and is fixed to an outer peripheral wall of the shaft 20 by, for example, press-fitting at a location between the bearing segment 13 and the second cover 15. In this way, the manipulation member 30 is rotated integrally with the shaft 20.

First-bevel-gear teeth 321 are formed integrally with a side surface of the boss portion 32, which is located on the second cover 15 side. The first-bevel-gear teeth 321 are arranged one after another at generally equal intervals in the circumferential direction. An axial projecting length of each of the first-bevel-gear teeth 321, which project toward a rotor 54 of the hysteresis mechanism 50, circumferentially progressively increases in the accelerator closing direction. Furthermore, a sloped surface is formed in a distal end part of each of the first-bevel-gear teeth 321 such that the sloped surface of each of the first-bevel-gear teeth 321 progressively approaches the rotor 54 in the accelerator closing direction.

A first friction member 323 is formed in a side surface of the boss portion 32, which is located on the bearing segment 13 side. The first friction member 323 is configured into an annular form and is placed between the boss portion 32 and the inner wall of the housing 12 on a radially outer side of the shaft 20. When the boss portion 32 is urged in a direction away from the rotor 54, i.e., in a direction toward the bearing segment 13, the boss portion 32 frictionally engages the first friction member 323. The frictional force between the boss portion 32 and the first friction member 323 acts as a rotational resistance force (or simply referred to as a rotational resistance) against the rotation of the boss portion 32.

One end part of the arm connecting portion 34 is connected to the outer peripheral surface of the boss portion 32, which is located at a radially outer side, and the other end part of the arm connecting portion 34 extends to the outside of the support member 10 through the communication hole 111.

The spring receiving portion 35 is formed to extend from the boss portion 32 toward the upper side in the inside space 11. One end portion of the return spring 39 is engaged with the spring receiving portion 35.

The full-closing-side stopper portion 36 extends from the spring receiving portion 35 toward the upper side in the inside space 11. When the full-closing-side stopper portion 36 contacts a surface of an inner wall of the rear segment 123, which extends in the top-to-bottom direction, the rotation of the manipulation member 30 in the accelerator closing direction is limited at the accelerator-full-closing position.

As shown in FIG. 1, one end portion of the pedal arm 26 is fixed to the arm connecting portion 34, and the other end portion of the pedal arm 26 downwardly extends toward the ground (the lower side). The pedal 28 is connected to the other end portion of the peal arm 26. The pedal 28 converts the pedal force of the driver into a rotational torque, which is exerted about a rotational axis of the shaft 20, and this rotational torque is conducted to the shaft 20 through the rotatable body 38.

Figure 2:
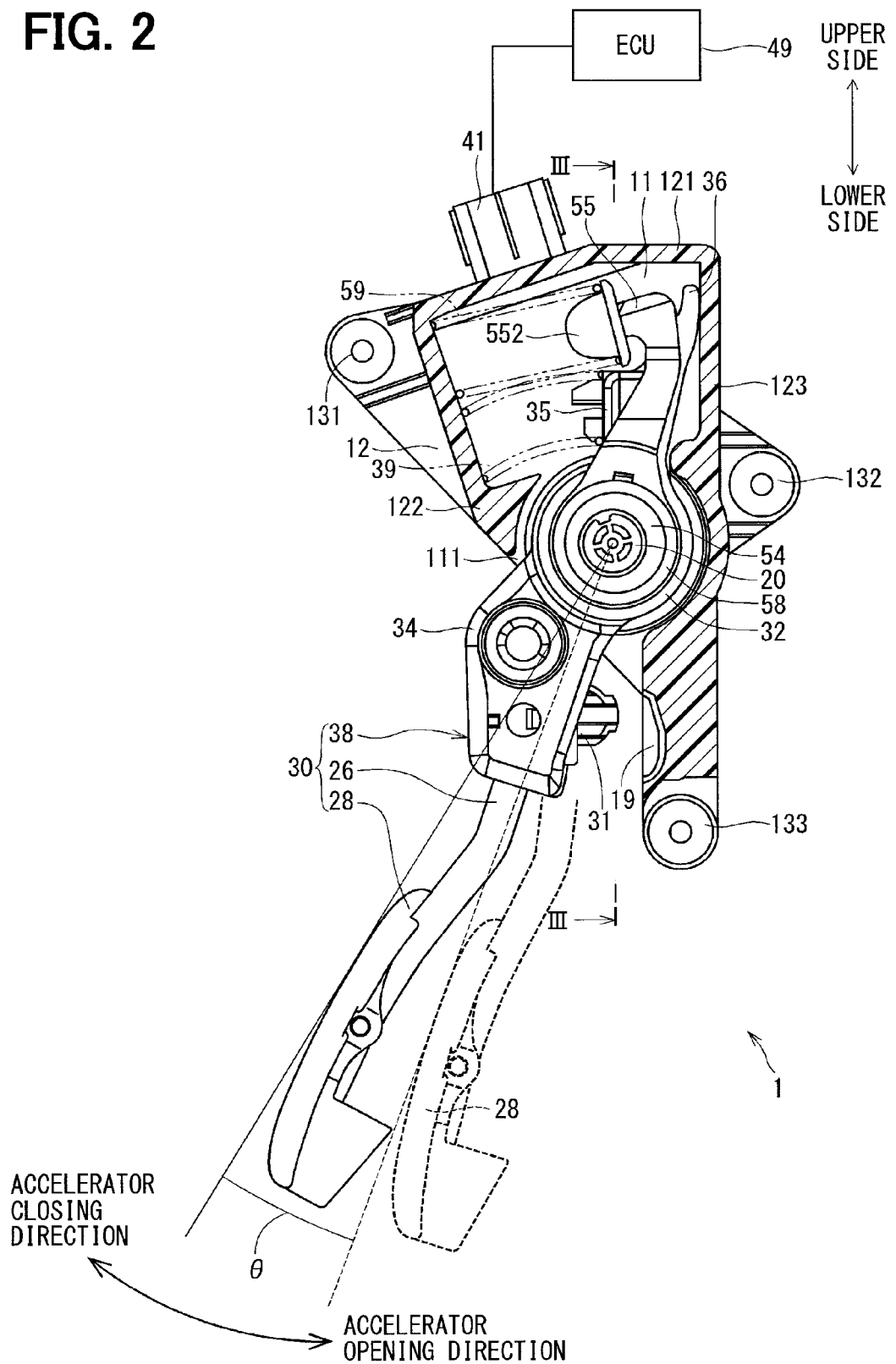
FIG. 2 is a cross-sectional view of the accelerator apparatus of the first embodiment.
Figure 3:
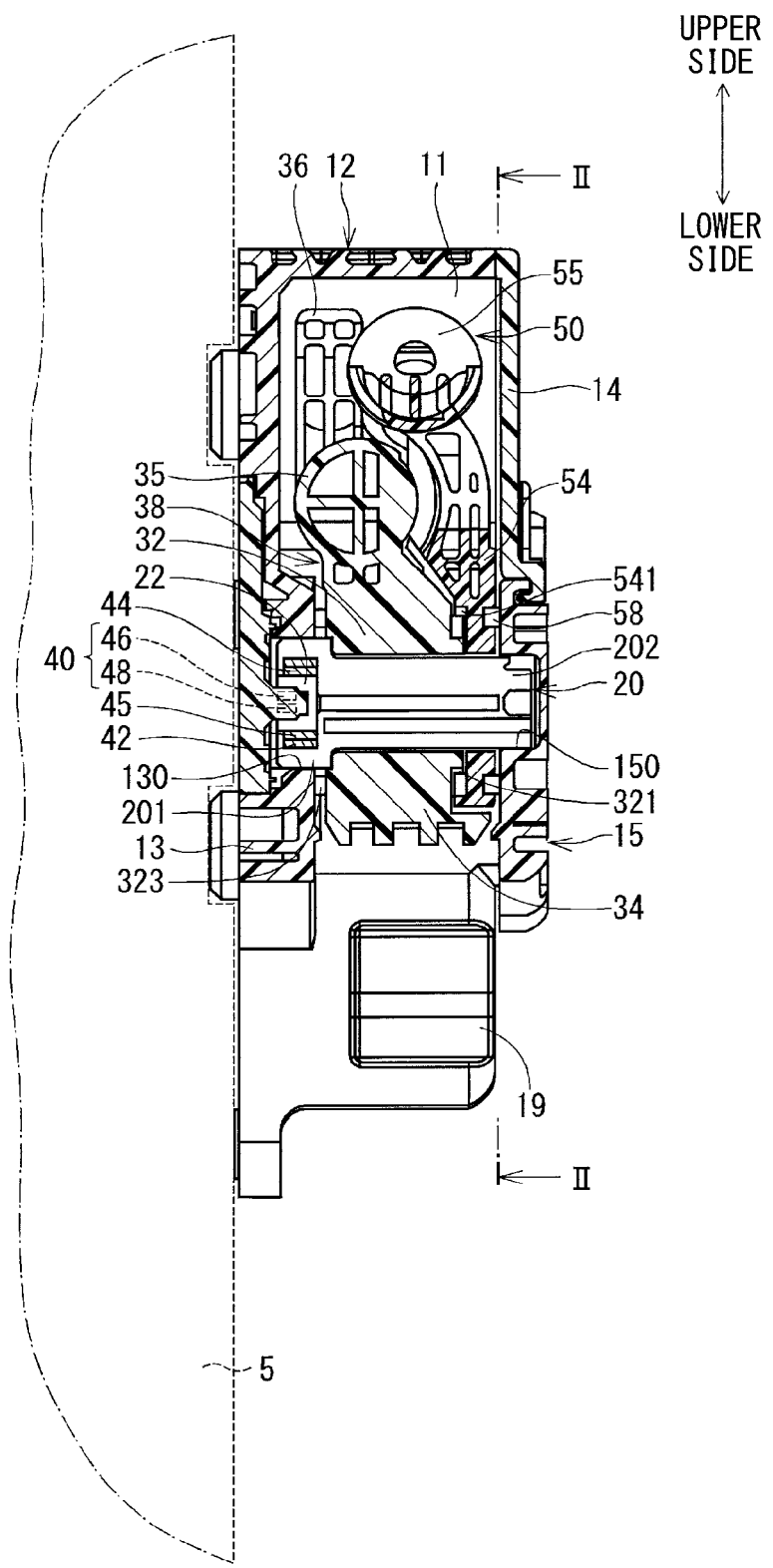
FIG. 3 is a cross sectional view taken along line III-III in FIG. 2.

When the pedal 28 is rotated in the accelerator opening direction from a position, at which the accelerator apparatus 1 is held in the accelerator-full-closing state (the accelerator-full-closing position) shown in FIG. 2, the rotational angle of the pedal 28 from the accelerator-full-closing position, which serves as a reference point, in the accelerator opening direction is increased. Hereinafter, a rotational angle of the pedal 28, which is reached upon movement of the pedal arm 26 and the pedal 28 to a position indicated by, for example, a dotted line, is denoted as a rotational angle θ. The accelerator opening degree is increased in response an increase in the rotational angle θ. Furthermore, when the pedal 28 is rotated in the accelerator closing direction, the rotational angle of the pedal 28 is reduced, and thereby the accelerator opening degree is reduced. The rotational angle θ of the pedal 28 corresponds to a sensed rotational angle of the magnetic field generating device relative to a plurality of magnetic field sensing devices (also referred to as a magnetic field sensing means).

The return spring 39 is made of a coil spring, and the other end portion of the return spring 39 is engaged with the inner wall of the front segment 122. The return spring 39, which serves as an urging device (an urging means), urges the manipulation member 30 in the accelerator closing direction. The urging force of the return spring 39, which is applied to the manipulation member 30, is increased when the rotational angle of the manipulation member 30, i.e., the rotational angle θ of the pedal 28 is increased. Furthermore, this urging force is set to enable returning of the manipulation member 30 and the shaft 20 to the accelerator-full-closing position regardless of the rotational position of the manipulation member 30 at the time of releasing the manipulation member 30.

The rotational angle sensor 40 includes a first Hall IC 46 and a second Hall IC 48.

Figure 4:
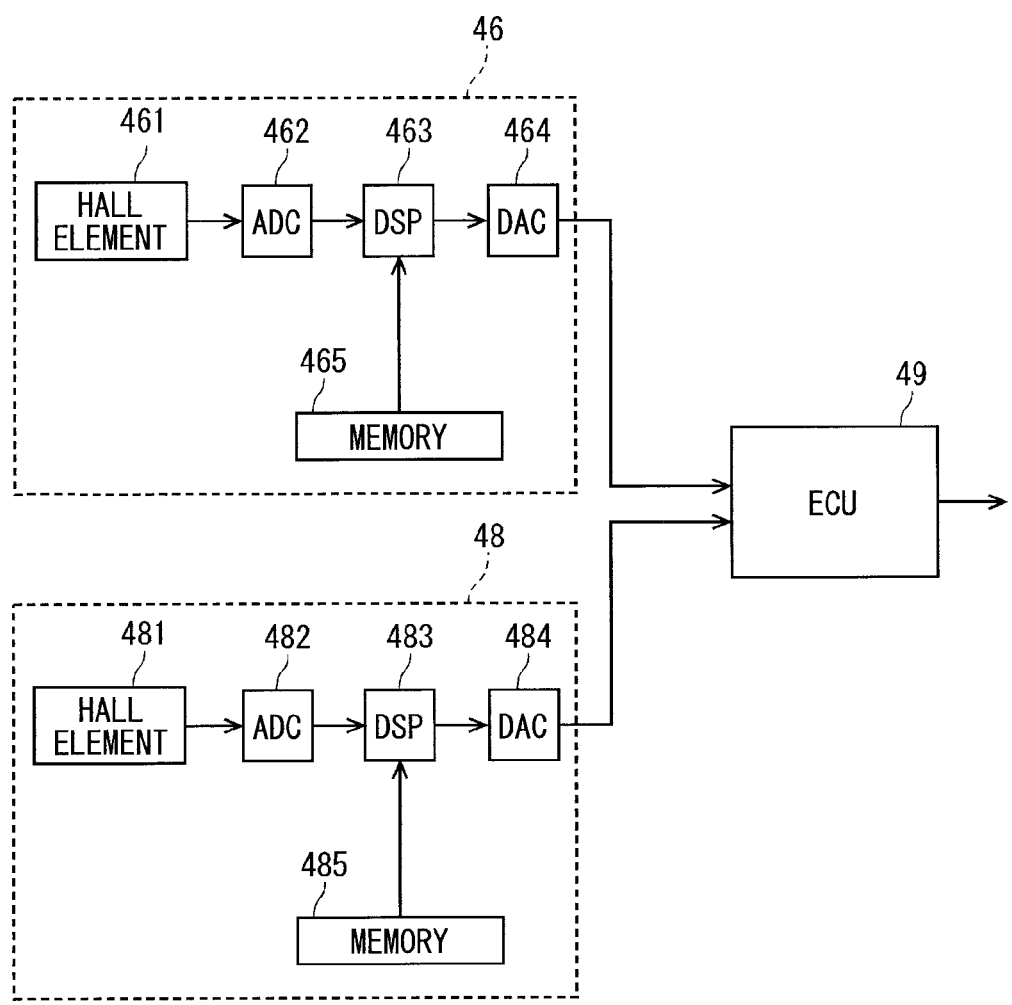
FIG. 4 is a schematic view, showing structures of Hall ICs and a relationship of the Hall ICs relative to an electronic control unit of the accelerator apparatus according to the first embodiment.

The first Hall IC 46 and the second Hall IC 48 are placed between the magnet 44 and the magnet 45. As shown in FIG. 4, the first Hall IC 46 includes a Hall element 461, an analog-to-digital converter (ADC) 462, a digital signal processor (DSP) 463, a digital-to-analog converter (DAC) 464 and a memory 465. The second Hall IC 48 includes a Hall element 481, an ADC 482, a DSP 483, a DAC 484 and a memory 485. The first Hall IC 46 computes (obtains) a first voltage $V_1$, which includes information about the rotational angle of the pedal 28, and outputs the first voltage $V_1$ to the ECU 49 through a connector 41. Similarly, the second Hall IC 48 computes (obtains) a second voltage $V_2$, which includes information about the rotational angle of the pedal 28, and outputs the second voltage $V_2$ to the ECU 49 through the connector 41. The ECU 49, which is also referred to as an electronic control device, serves as an abnormality determining device (or an abnormality determining means). The ECU 49 computes the rotational angle θ of the pedal 28 based on the first voltage $V_1$ and the second voltage $V_2$. The ECU 49 determines whether the rotational angle θ of the pedal 28 is abnormal based on the first voltage $V_1$ and the second voltage $V_2$. The first Hall IC 46 and the second Hall IC 48 serve as the magnetic field sensing devices. The Hall IC 46 serves as one of the magnetic field sensing devices. The Hall IC 48 serves as another one of the magnetic field sensing devices.

The hysteresis mechanism 50 includes the rotor 54, a second friction member 58 and a hysteresis spring 59.

The rotor 54 is provided between the boss portion 32 and the inner wall of the second cover 15 at a location, which is on a radially outer side of the shaft 20. The rotor 54 is configured into an annular form. The rotor 54 is rotatable relative to the shaft 20 and the boss portion 32 and can be moved toward or away from the boss portion 32. Second-bevel-gear teeth 541 are formed integrally with a side surface of the rotor 54, which is located on the boss portion 32 side. The second-bevel-gear teeth 541 are arranged one after another at generally equal intervals in the circumferential direction. An axial projecting length of each of the second-bevel-gear teeth 541, which project toward the boss portion 32, circumferentially progressively increases in the accelerator opening direction. Furthermore, a sloped surface is formed in a distal end part of each of the second-bevel-gear teeth 541 such that the sloped surface of each of the second-bevel-gear teeth 541 progressively approaches the rotor 54 in the accelerator opening direction.

When each of the first-bevel-gear teeth 321 contacts the corresponding one of the second-bevel-gear teeth 541 in the circumferential direction, the rotation can be transmitted between the boss portion 32 and the rotor 54. That is, the rotation of the boss portion 32 in the accelerator opening direction can be transmitted to the rotor 54 thorough the first-bevel-gear teeth 321 and the second-bevel-gear teeth 541. Furthermore, the rotation of the rotor 54 in the accelerator closing direction can be transmitted to the boss portion 32 through the second-bevel-gear teeth 541 and the first-bevel-gear teeth 321.

Furthermore, the sloped surface of each of the first-bevel-gear teeth 321 and the sloped surface of the corresponding one of the second-bevel-gear teeth 541 are engaged with each other and displace the boss portion 32 and the rotor 54 away from each other when the rotational angle of the boss portion 32 is on a side of a rotational angle of the boss portion 32 (the rotational angle of the boss portion 32 at the accelerator-full-closing time) in the accelerator opening direction, i.e., when the rotational position of the boss portion 32 is on the accelerator-full-opening position side of the accelerator-full-closing position. At this time, the first-bevel-gear teeth 321 urge the boss portion 32 toward the housing 12 by the urging force, which increases when the rotational angle of the boss portion 32 from the accelerator-full-closing position is increased. Furthermore, the second-bevel-gear teeth 541 urge the rotor 54 toward the second cover 15 by the urging force, which increases when the rotational angle of the boss portion 32 from the accelerator-full-closing position is increased.

The second friction member 58 is configured into an annular form and is placed between the rotor 54 and the inner wall of the second cover 15 on the radially outer side of the shaft 20. When the rotor 54 is urged in the direction away from the boss portion 32, i.e., in the direction toward the second cover 15, the rotor 54 is frictionally engaged with the second friction member 58. The frictional force between the rotor 54 and the second friction member 58 acts as the rotational resistance force (or simply referred to as the rotational resistance) against the rotation of the rotor 54.

The hysteresis spring 59 is formed as a coil spring. One end portion of the hysteresis spring 59 is engaged with a spring receiving member 552. The spring receiving member 552 is engaged with a spring engaging portion 55, which extends from the rotor 54 toward the upper side in the inside space 11. Furthermore, the other end portion of the hysteresis spring 59 is engaged with the inner wall of the front segment 122. The hysteresis spring 59 urges the rotor 54 in the accelerator closing direction. The urging force of the hysteresis spring 59 is increased when the rotational angle of the rotor 54 is increased. The torque, which is applied to the rotor 54 by the urging force of the hysteresis spring 59, is conducted to the boss portion 32 through the second-bevel-gear teeth 541 and the first-bevel-gear teeth 321.

In the accelerator apparatus 1 of the first embodiment, a computing process of the first voltage $V_1$ at the first Hall IC 46, a computing process of the second voltage $V_2$ at the second Hall IC 48 and an abnormality determining process at the ECU 49 have characteristic features. These features will be described with reference to FIGS. 4 to 5B.

Figure 5A:
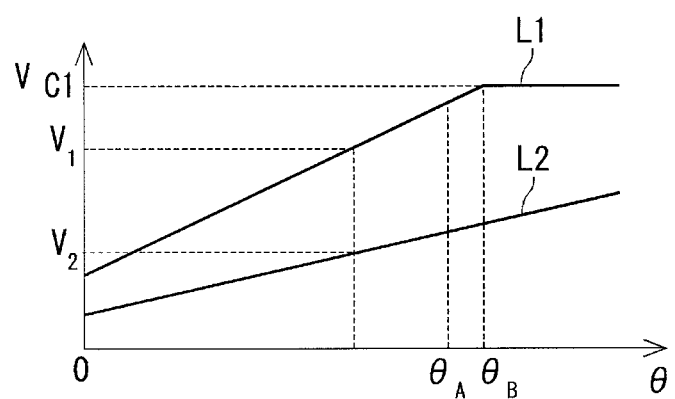
FIG. 5A is a diagram showing a relationship of output voltages of the Hall ICs relative to a rotational angle of the pedal in the first embodiment.
Figure 5B:
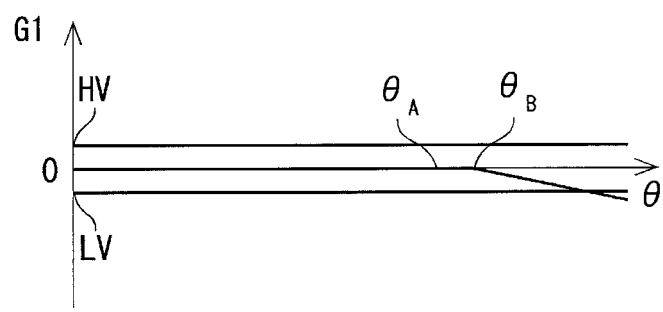
FIG. 5B is a diagram showing a relationship of an output difference relative to the rotational angle of the pedal in the first embodiment.

FIG. 5A shows a relationship of the first voltage $V_1$ relative to the rotational angle θ of the pedal 28 and a relationship of the second voltage $V_2$ relative to the rotational angle θ of the pedal 28. In FIG. 5A, the relationship between the rotational angle θ of the pedal 28 and the first voltage $V_1$ is indicated by a solid line L1. Furthermore, the relationship between the rotational angle θ of the pedal 28 and the second voltage $V_2$ is indicated by a solid line L2. Furthermore, FIG. 5B shows a relationship of an output difference G1, which is a voltage difference computed based on the first voltage $V_1$ and the second voltage $V_2$, relative to the rotational angle θ of the pedal 28. In FIGS. 5A and 5B, the rotational angle θ of the pedal 28 is zero degrees in the state where the full-closing-side stopper portion 36 contacts the inner wall of the support member 10.

When a magnetic field is applied to each of the Hall elements 461, 481, through which an electric current flows, a voltage is generated in the Hall element 461, 481. This phenomenon is referred to as a Hall effect. A density of a magnetic flux, which penetrates through the Hall element 461, 481, changes when the shaft 20 and the magnets 44, 45 are rotated about the rotational axis of the shaft 20. A value of the voltage discussed above is substantially proportional to the density of the magnetic flux, which penetrates through the Hall element 461, 481.

In each of the first Hall IC 46 and the second Hall IC 48, the voltage, which is generated in the Hall element 461, 481, is converted into a digital signal through the ADC 462, 482 and is supplied to the DSP 463, 483. The DSP 463 computes the first voltage $V_1$ based on the digital signal, which is supplied from the ADC 462. Furthermore, the DSP 483 computes the second voltage $V_2$ based on the digital signal, which is supplied from the ADC 482. The first voltage $V_1$, which is computed by the DSP 463, is supplied to the DAC 464. Then, the DAC 464 converts the first voltage $V_1$ into an analog signal and supplies the converted analog signal to the ECU 49. Similarly, the second voltage $V_2$, which is computed by the DSP 483, is supplied to the DAC 484. Then, the DAC 484 converts the second voltage $V_2$ into an analog signal and supplies the converted analog signal to the ECU 49. The ECU 49 computes the rotational angle θ of the pedal 28 based on the first voltage $V_1$ and the second voltage $V_2$ (more specifically, based on at least one of the first voltage $V_1$ and the second voltage $V_2$). Furthermore, the ECU 49 determines whether this computed rotational angle (i.e., the sensed rotational angle) θ of the pedal 28 is abnormal based on the first voltage $V_1$ and the second voltage $V_2$.

In the accelerator apparatus 1 of the first embodiment, the computation process is performed by the DSPs 463, 483 such that the first voltage $V_1$ is set to be twice larger than the second voltage $V_2$ when the rotational angle θ of the pedal 28 is equal to or larger than the angle of zero degrees (i.e., the full-closing-time rotational angle of the pedal 28, which is the rotational angle of the pedal at the accelerator-full-closing time, i.e., the accelerator-full-closing state) and is equal to or smaller than a predetermined rotational angle $θ_B$. The predetermined rotational angle $θ_B$ is a rotational angle of the pedal 28 that is positioned on one side of a full-opening-time rotational angle $θ_A$, which is opposite from the full-closing-time rotational angle of the pedal 28 in the accelerator opening direction. The full-opening-time rotational angle $θ_A$ is the rotational angle of the pedal 28 at the accelerator-full-opening time (the accelerator-full-opening state). Thus, the relationship between the first voltage $V_1$ and the second voltage $V_2$ is expressed by the following equation (1), which serves as a predetermined condition.

$$V_1 = 2 \times V_2 \quad \text{Equation (1)}$$

In the first Hall IC 46, the DSP 468 determines the current rotational angle θ of the pedal 28, which is shown in FIG. 5A, based on the voltage outputted from the ADC 462 before the time of outputting the voltage V1 to the DAC 464. When this rotational angle (sensed rotational angle) θ of the pedal 28 is equal to or larger than the angle of zero degrees and is equal to or smaller than the predetermined rotational angle $θ_B$, the first voltage $V_1$ is set to be twice larger than the second voltage $V_{21}$ at the DSP 463, as discussed above. Similarly, the DSP 483 of the second Hall IC 48 determines the current rotational angle θ of the pedal 28 based on the voltage outputted from the ADC 482.

Next, the ECU 49 computes the output difference G1 based on the first voltage $V_1$ and the second voltage $V_2$. The output difference G1 is expressed by the following equation (2).

$$G1 = V_1/2 - V_2 \quad \text{Equation (2)}$$

In the accelerator apparatus 1 of the first embodiment, as shown in FIG. 5B, a first threshold value HV and a second threshold value LV are set. The first threshold value HV is a threshold value, which is set on a larger side with respect to the output difference G1. The second threshold value LV is a threshold value, which is set on a smaller side with respect to the output difference G1. Thereby, the second threshold value LV is smaller than the first threshold value HV. In a case where the output difference G1, which is computed with the equation (2), is between the first threshold value HV and the second threshold value LV, it is determined that the sensed rotational angle θ is normal. In the accelerator apparatus 1 of the first embodiment, the first voltage $V_1$ is set to be twice larger than the second voltage $V_2$ when the rotational angle θ of the pedal 28 is equal to or larger than the angle of zero degrees and is equal to or smaller than the predetermined rotational angle $θ_B$. Therefore, in the state where the rotational angle θ is equal to or larger than the angle of zero degrees and is equal to or smaller than the predetermined rotational angle $θ_B$, the output difference G1 becomes zero and is located between the first threshold value HV and the second threshold value LV. Thereby, the ECU 49 determines that the rotational angle of the pedal 28 is normal.

When the rotational angle of the pedal 28 is larger than the predetermined rotational angle $θ_B$, the DSP 463 of the first Hall IC 46 sets the first voltage $V_1$ to a predetermined constant value (e.g., a predetermined constant value C1 shown in FIG. 5A). That is, the first voltage $V_1$ is clamped at the predetermined constant value (he predetermined constant voltage) C1 and thereby forms a clamped part in an angular range where the rotational angle θ is larger than the predetermined rotational angle $θ_B$. In a case where the rotational angle θ of the pedal 28 is larger than the predetermined rotational angle $θ_B$, the output difference G1, which is computed at the ECU 49 with the equation (2), is smaller than zero. When the rotational angle θ of the pedal 28 is larger than the predetermined rotational angle $θ_B$, the output difference G1 is equal to or smaller than the second threshold value LV, as shown in FIG.

5B. Thereby, the ECU 49 determines that the sensed rotational angle θ of the pedal 28 is abnormal.

Next, the operation of the accelerator apparatus 1 will be described.

When the pedal 28 is depressed by the foot of the driver, the manipulation member 30 is rotated together with the shaft 20 in the accelerator opening direction about the rotational axis of the shaft 20 in response to the pedal force of the driver applied to the pedal 28. At this time, in order to rotate the manipulation member 30 and the shaft 20, there is required a pedal force, which generates a torque that is larger than a sum of a torque, which is exerted by the urging force of the return spring 39 and the urging force of the hysteresis spring 59, and a resistance torque, which is exerted by the frictional force of the first friction member 232 and the frictional force of the second friction member 58.

When the pedal 28 is depressed, the resistance torque, which is exerted by the frictional force of the first friction member 323 and the frictional force of the second friction member 58, acts to limit the rotation of the pedal 28 in the accelerator opening direction. Therefore, the relationship between the pedal force and the rotational angle of the pedal 28 at the time of depressing the pedal 28 is such that the pedal force at the time of depressing the pedal 28 is larger than the pedal force at the time of releasing (i.e., returning) the pedal 28 even at the same rotational angle of the pedal 28.

In order to maintain the depressed state of the pedal 28, it is only required to apply the pedal force that generates the torque, which is larger than a difference between the torque generated by the urging forces of the return spring 39 and the hysteresis spring 59 and the resistance torque generated by the frictional forces of the first and second friction members 323, 58. In other words, when the driver wants to maintain the depressed state of the pedal 28 after depressing the pedal 28 to the desired position, the driver may reduce the applied pedal force by a certain amount. That is, at the time of maintaining the depressed state of the pedal 28, the resistance torque, which is exerted by the frictional force of the first friction member 323 and the frictional force of the second friction member 58, acts to limit the rotation of the pedal 28 in the accelerator closing direction.

In order to return the pedal 28 toward the accelerator-full-closing position, the pedal force applied to the pedal 28 should generate a torque that is smaller than the difference between the torque, which is generated by the urging forces of the return spring 39 and the hysteresis spring 59, and the resistance torque, which is generated by the frictional forces of the first and second friction members 323, 58. Here, when the pedal 28 needs to be quickly returned to the accelerator-full-closing position, it is only required to stop the depressing of the pedal 28. Therefore, the burden on the driver of the vehicle is minimized. Thereby, when the depressed pedal 28 is returned toward the accelerator-full-closing position of the pedal 28, the burden on the driver is relatively small. At the time of returning the pedal 28, the resistance torque, which is exerted by the frictional force of the first friction member 323 and the frictional force of the second friction member 58, acts to limit the rotation of the pedal 28 in the accelerator closing direction.

In the accelerator apparatus 1 of the first embodiment, the ECU 49 determines whether the sensed rotational angle θ of the pedal 28 is abnormal based on the output difference G1, which is computed based on the first voltage $V_1$ and the second voltage $V_2$. The first Hall IC 46 sets the first voltage $V_1$ to the predetermined constant value C1 and outputs the predetermined constant value C1 to the ECU 49 in the case where the rotational angle θ of the pedal 28 is larger than the predetermined rotational angle $θ_B$, which is the rotational angle of the pedal 28 on the one side of the full-opening-time rotational angle $θ_A$ in the accelerator opening direction. The ECU 49 computes the output difference G1 based on the first voltage $V_1$, which now becomes the predetermined constant value, and the second voltage $V_2$, which changes according to the rotational angle θ of the pedal 28. When the computed output difference G1 is equal to or smaller than the second threshold value LV, the ECU 49 determines that the sensed rotational angle θ of the pedal 28 is abnormal. In this way, the accelerator apparatus 1 can sense the abnormality of the sensed rotational angle θ, which is caused by the excessive rotation of the pedal 28 in the accelerator opening direction from the rotational angle of the pedal 28 at the accelerator-full-opening time. Therefore, it is possible to sense the abnormality, which is the rotation of the pedal 28 in the accelerator opening direction from the normal accelerator-full-opening position of the pedal 28 due to, for example, the deformation of the manipulation member 30.

Furthermore, the abnormality determining process of the rotational angle θ can be executed only by changing the program of the computing process of the DSP 463, which computes the first voltage $V_1$. Therefore, the abnormality of the sensed rotational angle θ can be sensed at the low costs.

Second Embodiment

Next, the accelerator apparatus according to a second embodiment of the present disclosure will be described with reference to FIGS. 6A and 6B. In the second embodiment, the relationship between the first voltage and the second voltage differs from that of the first embodiment. In the following description, components, which are similar to those of the first embodiment, will be indicated by the same reference numerals and will not be described further.

Figure 6A:
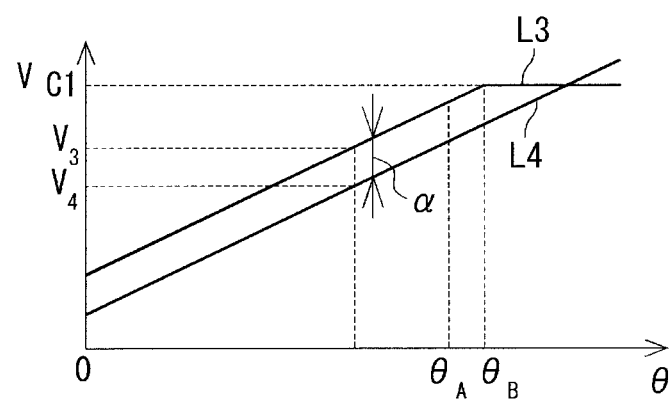
FIG. 6A is a diagram showing a relationship of output voltages of the Hall ICs relative to the rotational angle of the pedal in a second embodiment of the present disclosure.
Figure 6B:
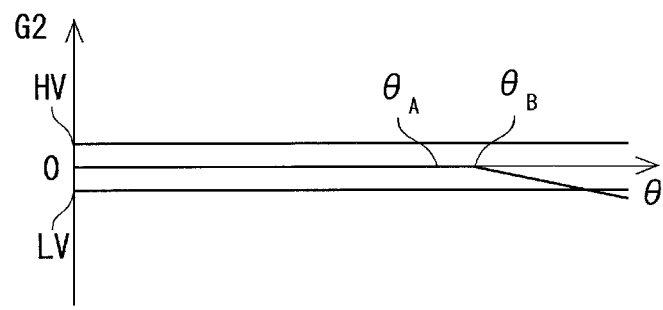
FIG. 6B is a diagram showing a relationship of an output difference relative to the rotational angle of the pedal in the second embodiment.

FIG. 6A shows a relationship of the first voltage $V_3$ relative to the rotational angle θ of the pedal 28 and a relationship of the second voltage $V_4$ relative to the rotational angle θ of the pedal 28. In FIG. 6A, the relationship between the rotational angle θ of the pedal 28 and the first voltage $V_3$ is indicated by a solid line L3, and the relationship between the rotational angle θ of the pedal 28 and the second voltage $V_4$ is indicated by a solid line L4. Furthermore, FIG. 6B shows a relationship of an output difference G2, which is a voltage difference computed based on the first voltage $V_3$ and the second voltage $V_4$, relative to the rotational angle θ of the pedal 28.

In the accelerator apparatus of the second embodiment, the computation process is performed by the DSP 463, 483 such that the first voltage $V_3$ is set to be larger than second voltage $V_4$ by a predetermined value (e.g., a given value α, which is shown in FIG. 6A and is also referred to as a constant) when the rotational angle θ of the pedal 28 is equal to or larger than the angle of zero degrees and is equal to or smaller than the predetermined rotational angle $θ_B$. That is, the relationship between the first voltage $V_3$ and the second voltage $V_4$ is expressed by the following equation (3), which serves as a predetermined condition.

$$V_3 = V_4 + α \qquad \text{Equation (3)}$$

At this time, the output difference G2 is expressed by the following equation (4).

$$G2 = V_3 - V_4 - α \qquad \text{Equation (4)}$$

In the case where the rotational angle θ of the pedal 28 is equal to or larger than the angle of zero degrees and is equal to or smaller than the predetermined rotational angle $θ_B$, the output difference G2 is located between the first threshold value HV and the second threshold value LV. Thereby, the ECU 49 determines that the rotational angle θ of the pedal 28 is normal.

When the rotational angle θ of the pedal 28 is larger than the predetermined rotational angle $θ_B$, the DSP 463 of the first Hall IC 46 sets the first voltage $V_1$ to the predetermined constant value (e.g., the predetermined constant value C1 shown in FIG. 6A). That is, the first voltage $V_3$ is clamped at the predetermined constant value C1 and thereby forms the clamped part in the range where the rotational angle θ is larger than the predetermined rotational angle $θ_B$. Thereby, in a case where the rotational angle θ of the pedal 28 is larger than the predetermined rotational angle $θ_B$, the output difference G2, which is computed at the ECU 49 with the equation (4), is smaller than zero. As shown in FIG. 6B, when the output difference G2 is equal to or smaller than the second threshold value LV, the ECU 49 determines that the rotational angle θ of the pedal 28 is abnormal.

In the accelerator apparatus of the second embodiment, the rotational angle θ of the pedal 28 is determined to be abnormal when the output difference G2, which is computed at the ECU 49, is equal to or smaller than the second threshold value LV. In this way, the accelerator apparatus of the second embodiment achieves the advantages, which are similar to those of the first embodiment.

Third Embodiment

Next, an accelerator apparatus according to a third embodiment of the present disclosure will be described with reference to FIGS. 7A and 7B. In the third embodiment, the first voltage, which is outputted from the first Hall IC, differs from that of the first embodiment when the rotational angle of the pedal 28 is larger than the predetermined rotational angle. In the following description, components, which are similar to those of the first embodiment, will be indicated by the same reference numerals and will not be described further.

Figure 7A:
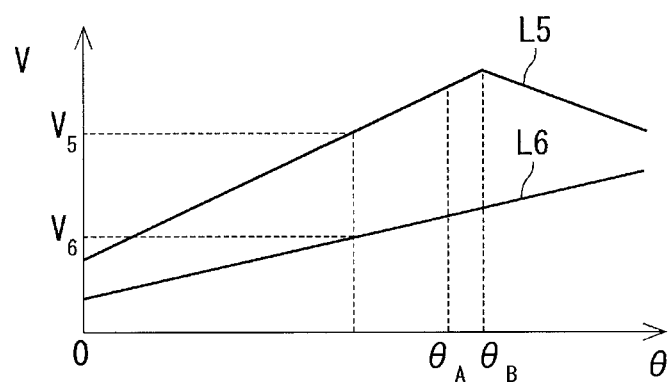
FIG. 7A is a diagram showing a relationship of output voltages of the Hall ICs relative to the rotational angle of the pedal in a third embodiment of the present disclosure.
Figure 7B:
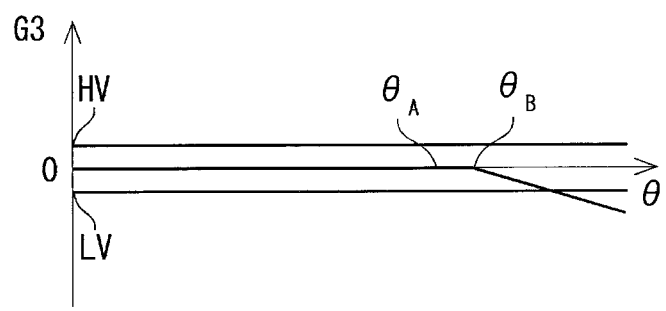
FIG. 7B is a diagram showing a relationship of an output difference relative to the rotational angle of the pedal in the third embodiment.

FIG. 7A shows a relationship of the first voltage $V_5$ relative to the rotational angle θ of the pedal 28 and a relationship of the second voltage $V_6$ relative to the rotational angle θ of the pedal 28. In FIG. 7A, the relationship between the rotational angle θ of the pedal 28 and the first voltage $V_5$ is indicated by a solid line L5, and the relationship between the rotational angle θ of the pedal 28 and the second voltage $V_6$ is indicated by a solid line L6. Furthermore, FIG. 7B shows a relationship of an output difference G3, which is a voltage difference computed based on the first voltage $V_5$ and the second voltage $V_6$, relative to the rotational angle θ of the pedal 28.

In the accelerator apparatus 1 of the third embodiment, the computation process is performed by the DSP 463, 483 such that the first voltage $V_5$ is set to be twice larger than the second voltage $V_6$ when the rotational angle θ of the pedal 28 is equal to or larger than 0 degrees (i.e., the rotational angle of the pedal 28 in the accelerator-full-closing state) and is equal to or smaller than the predetermined rotational angle $θ_B$. That is, the relationship between the first voltage $V_5$ and the second voltage $V_6$ is expressed by the following equation (5), which serves as a predetermined condition.

$$V_5 = 2 \times V_6 \quad \text{Equation (5)}$$

At this time, the output difference G3 is expressed by the following equation (6).

$$G3 = V_5/2 - V_6 \quad \text{Equation (6)}$$

In the case where rotational angle θ is equal to or larger than the angle of zero degrees and is equal to or smaller than the predetermined rotational angle $θ_B$, the output difference G3 is zero and is located between the first threshold value HV and the second threshold value LV. Thereby, the ECU 49 determines that the rotational angle θ of the pedal 28 is normal.

When the rotational angle θ of the pedal 28 is larger than the predetermined rotational angle $θ_B$, the DSP 463 of the first Hall IC 46 reduces the first voltage $V_5$ in response to an increase in the rotational angle θ of the pedal 28 irrespective of the value computed with the equation (5). Thereby, in the case where the rotational angle θ of the pedal 28 is larger than the predetermined rotational angle $θ_B$, the output difference G3, which is computed at the ECU 49 with the equation (6), is smaller than zero. As shown in FIG. 7B, when the output difference G3 is equal to or smaller than the second threshold value LV, the ECU 49 determines that the rotational angle θ of the pedal 28 is abnormal.

In the accelerator apparatus of the third embodiment, the rotational angle θ of the pedal 28 is determined to be abnormal when the output difference G3, which is computed at the ECU 49, is equal to or smaller than the second threshold value LV. In this way, the accelerator apparatus of the third embodiment achieves the advantages, which are similar to those of the first embodiment. Furthermore, in the accelerator apparatus of the third embodiment, the output difference G3 more quickly becomes equal to or smaller than the second threshold value LV in comparison to the first embodiment in the range of the rotational angle, which is larger than the predetermined rotational angle $θ_B$. In this way, the accelerator apparatus of the third embodiment can more quickly sense the abnormality of the accelerator apparatus in comparison to the first embodiment.

Fourth Embodiment

Next, an accelerator apparatus according to a fourth embodiment of the present disclosure will be described with reference to FIGS. 8A and 8B. In the fourth embodiment, the first voltage, which is outputted from the first Hall IC, differs from that of the second embodiment when the rotational angle of the pedal 28 is larger than the predetermined rotational angle. In the following description, components, which are similar to those of the second embodiment, will be indicated by the same reference numerals and will not be described further.

Figure 8A:
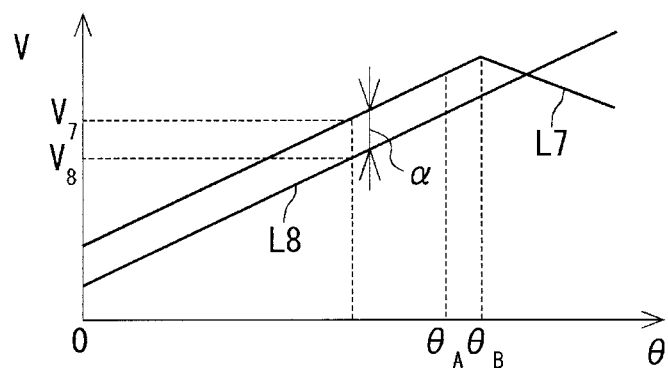
FIG. 8A is a diagram showing a relationship of output voltages of the Hall ICs relative to the rotational angle of the pedal in a fourth embodiment of the present disclosure.
Figure 8B:
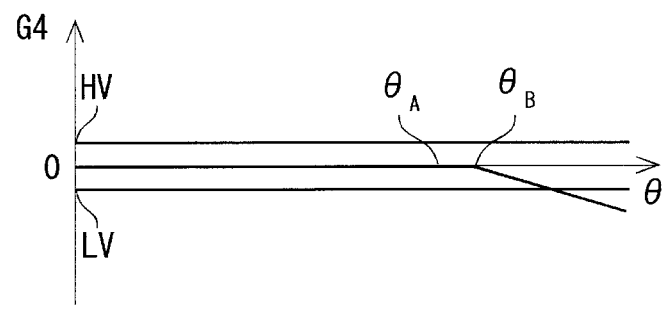
FIG. 8B is a diagram showing a relationship of an output difference relative to the rotational angle of the pedal in the fourth embodiment.

FIG. 8A shows a relationship of the first voltage $V_7$ relative to the rotational angle θ of the pedal 28 and a relationship of the second voltage $V_8$ relative to the rotational angle θ of the pedal 28. In FIG. 8A, the relationship between the rotational angle θ of the pedal 28 and the first voltage $V_7$ is indicated by a solid line L7, and the relationship between the rotational angle θ of the pedal 28 and the second voltage $V_8$ is indicated by a solid line L8. Furthermore, FIG. 8B shows a relationship of an output difference G4, which is a voltage difference computed based on the first voltage $V_7$ and the second voltage $V_8$, relative to the rotational angle θ of the pedal 28.

In the accelerator apparatus of the fourth embodiment, the computation process is performed by the DSP 463, 483 such that the first voltage $V_7$ is set to be larger than the second voltage $V_8$ by the predetermined value (e.g., the given value α, which is shown in FIG. 8A and is also referred to as the constant) when the rotational angle θ of the pedal 28 is equal to or larger than 0 degrees (i.e., the rotational angle of the pedal 28 in the accelerator-full-closing state) and is equal to or smaller than the predetermined rotational angle $θ_B$. That is, the relationship between the first voltage $V_7$ and the second voltage $V_8$ is expressed by the following equation (7), which serves as a predetermined condition.

$$V_7 = V_8 + \alpha \qquad \text{Equation (7)}$$

At this time, the output difference G4 is expressed by the following equation (8).

$$G4 = V_7 - V_8 - \alpha \qquad \text{Equation (8)}$$

In the case where the rotational angle θ is equal to or larger than the angle of zero degrees and is equal to or smaller than the predetermined rotational angle $\theta_B$, the output difference G4 is located between the first threshold value HV and the second threshold value LV. Thereby, the ECU 49 determines that the sensed rotational angle θ of the pedal 28 is normal.

When the rotational angle θ of the pedal 28 is larger than the predetermined rotational angle $\theta_B$, the DSP 463 of the first Hall IC 46 reduces the first voltage $V_7$ in response to an increase in the rotational angle θ of the pedal 28 irrespective of the value computed with the equation (7). Thereby, in the case where the rotational angle θ of the pedal 28 is larger than the predetermined rotational angle $\theta_B$, the output difference G4, which is computed at the ECU 49 with the equation (8), is smaller than zero. As shown in FIG. 8B, when the output difference G4 is equal to or smaller than the second threshold value LV, the ECU 49 determines that the sensed rotational angle θ of the pedal 28 is abnormal.

In the accelerator apparatus of the fourth embodiment, the sensed rotational angle θ of the pedal 28 is determined to be abnormal when the output difference G4, which is computed at the ECU 49, is equal to or smaller than the second threshold value LV. In this way, the accelerator apparatus of the fourth embodiment achieves the advantages, which are similar to those of the second embodiment. Furthermore, in the accelerator apparatus of the fourth embodiment, the output difference G4 more quickly becomes equal to or smaller than the second threshold value LV in comparison to the second embodiment in the range of the rotational angle, which is larger than the predetermined rotational angle $\theta_B$. In this way, the accelerator apparatus of the fourth embodiment can more quickly sense the abnormality of the accelerator apparatus in comparison to the second embodiment.

Fifth Embodiment

Next, an accelerator apparatus according to a fifth embodiment of the present disclosure will be described with reference to FIGS. 9A and 9B. In the fifth embodiment, the rotational angle, at which the first voltage outputted from the first Hall IC becomes the constant voltage, differs from that of the first embodiment. In the following description, components, which are similar to those of the first embodiment, will be indicated by the same reference numerals and will not be described further.

Figure 9A:
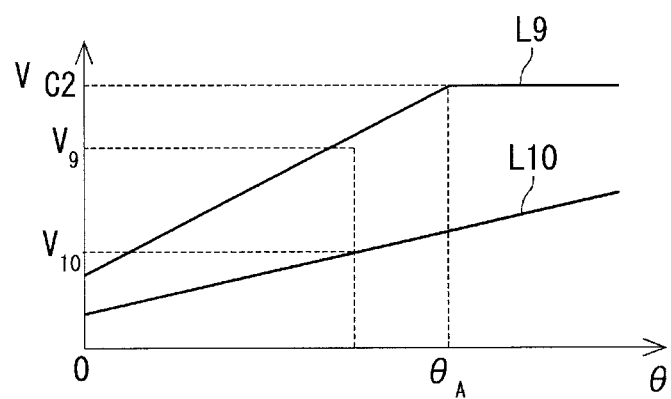
FIG. 9A is a diagram showing a relationship of output voltages of the Hall ICs relative to the rotational angle of the pedal in a fifth embodiment of the present disclosure.
Figure 9B:
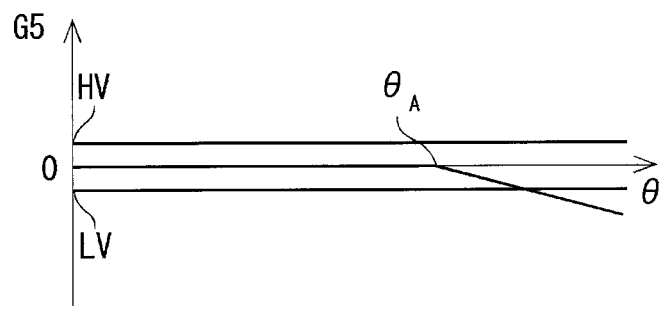
FIG. 9B is a diagram showing a relationship of an output difference relative to the rotational angle of the pedal in the fifth embodiment.

FIG. 9A shows a relationship of the first voltage $V_9$ relative to the rotational angle θ of the pedal 28 and a relationship of the second voltage $V_{10}$ relative to the rotational angle θ of the pedal 28. In FIG. 9A, the relationship between the rotational angle θ of the pedal 28 and the first voltage $V_9$ is indicated by a solid line L9, and the relationship between the rotational angle θ of the pedal 28 and the second voltage $V_{10}$ is indicated by a solid line L10. Furthermore, FIG. 9B shows a relationship of an output difference G5, which is a voltage difference computed based on the first voltage $V_9$ and the second voltage $V_{10}$, relative to the rotational angle θ of the pedal 28.

In the accelerator apparatus of the fifth embodiment, the computation process is performed by the DSP 463, 483 such that the first voltage $V_9$ is set to be twice larger than the second voltage $V_{10}$ when the rotational angle θ of the pedal 28 is equal to or larger than 0 degrees (i.e., the rotational angle of the pedal 28 in the accelerator-full-closing state) and is equal to or smaller than the full-opening-time rotational angle $\theta_A$. That is, the relationship between the first voltage $V_9$ and the second voltage $V_{10}$ is expressed by the following equation (9), which serves as a predetermined condition.

$$V_9 = 2 \times V_{10} \qquad \text{Equation (9)}$$

At this time, the output difference G5 is expressed by the following equation (10).

$$G5 = V_9/2 - V_{10} \qquad \text{Equation (10)}$$

In the case where the rotational angle θ is equal to or larger than the angle of zero degrees and is equal to or smaller than the full-opening-time rotational angle $\theta_A$, the output difference G5 becomes zero and is located between the first threshold value HV and the second threshold value LV. Thereby, the ECU 49 determines that the sensed rotational angle θ of the pedal 28 is normal.

When the rotational angle θ of the pedal 28 is larger than the full-opening-time rotational angle $\theta_A$, the DSP 463 of the first Hall IC 46 sets the first voltage $V_9$ to a predetermined constant value (e.g., a predetermined constant value C2 shown in FIG. 9A). That is, the first voltage $V_9$ is clamped at the predetermined constant value C2 and thereby forms the clamped part in an angular range where the rotational angle θ is larger than the full-opening-time rotational angle $\theta_A$. Thereby, in a case where the rotational angle θ of the pedal 28 is larger than the full-opening-time rotational angle $\theta_A$, the output difference G5, which is computed at the ECU 49 with the equation (10), is smaller than zero. As shown in FIG. 9B, when the output difference G5 is equal to or smaller than the second threshold value LV, the ECU 49 determines that the sensed rotational angle θ of the pedal 28 is abnormal.

In the accelerator apparatus of the fifth embodiment, the sensed rotational angle θ of the pedal 28 is determined to be abnormal when the output difference G5, which is computed at the ECU 49, is equal to or smaller than the second threshold value LV. In this way, the accelerator apparatus of the fifth embodiment achieves the advantages, which are similar to those of the first embodiment.

Sixth Embodiment

Next, an accelerator apparatus according to a sixth embodiment of the present disclosure will be described with reference to FIGS. 10A and 10B. In the sixth embodiment, the rotational angle, at which the first voltage outputted from the first Hall IC becomes the constant voltage, differs from that of the second embodiment. In the following description, components, which are similar to those of the second embodiment, will be indicated by the same reference numerals and will not be described further.

Figure 10A:
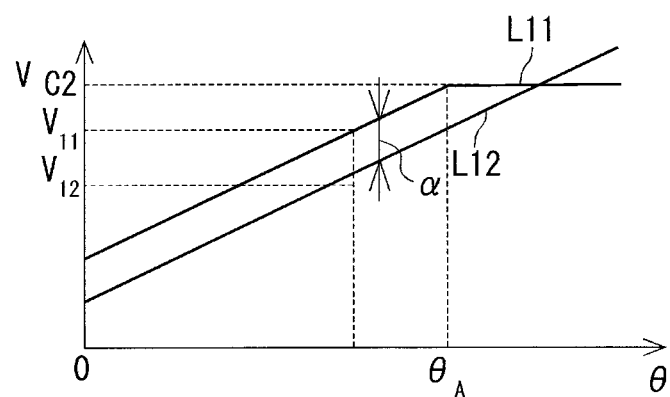
FIG. 10A is a diagram showing a relationship of output voltages of the Hall ICs relative to the rotational angle of the pedal in a sixth embodiment of the present disclosure.
Figure 10B:
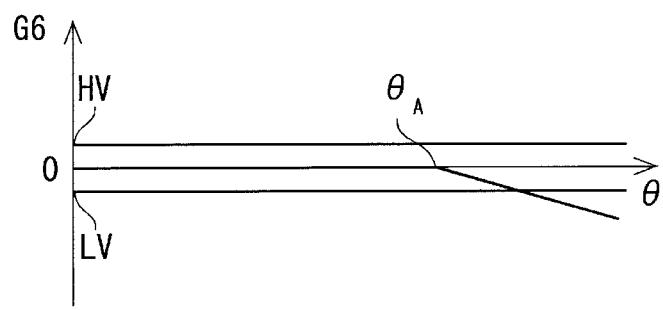
FIG. 10B is a diagram showing a relationship of an output difference relative to the rotational angle of the pedal in the sixth embodiment.

FIG. 10A shows a relationship of the first voltage $V_{11}$ relative to the rotational angle θ of the pedal 28 and a relationship of the second voltage $V_{12}$ relative to the rotational angle θ of the pedal 28. In FIG. 10A, the relationship between the rotational angle θ of the pedal 28 and the first voltage $V_{11}$ is indicated by a solid line L11, and the relationship between the rotational angle θ of the pedal 28 and the second voltage $V_{12}$ is indicated by a solid line L12. Furthermore, FIG. 10B shows a relationship of an output difference G6, which is a voltage difference computed based on the first voltage $V_{11}$ and the second voltage $V_{12}$, relative to the rotational angle θ of the pedal 28.

In the accelerator apparatus of the sixth embodiment, the computation process is performed by the DSP 463, 483 such that the first voltage $V_{11}$ is set to be larger than the second voltage $V_{12}$ by a predetermined value (e.g., the given value α, which is shown in FIG. 10A and is also referred to as the constant) when the rotational angle θ of the pedal 28 is equal to or larger than 0 degrees (i.e., the rotational angle of the pedal 28 in the accelerator-full-closing state) and is equal to or smaller than the full-opening-time rotational angle $\theta_A$. That is, the relationship between the first voltage $V_{11}$ and the second voltage $V_{12}$ is expressed by the following equation (11), which serves as a predetermined condition.

$$V_{11} = V_{12} + \alpha \qquad \text{Equation (11)}$$

At this time, the output difference G6 is expressed by the following equation (12).

$$G6 = V_{11} - V_{12} - \alpha \qquad \text{Equation (12)}$$

In the case where the rotational angle θ is equal to or larger than the angle of zero degrees and is equal to or smaller than the full-opening-time rotational angle $\theta_A$, the output difference G6 becomes zero and is located between the first threshold value HV and the second threshold value LV. Thereby, the ECU 49 determines that the sensed rotational angle θ of the pedal 28 is normal.

When the rotational angle θ of the pedal 28 is larger than the full-opening-time rotational angle $\theta_A$, the DSP 463 of the first Hall IC 46 sets the first voltage $V_{11}$ to a predetermined constant value (e.g., the predetermined constant value C2 shown in FIG. 10A). That is, the first voltage $V_{11}$ is clamped at the predetermined constant value C2 and thereby forms the clamped part in an angular range where the rotational angle θ is larger than the full-opening-time rotational angle $\theta_A$. Thereby, when the rotational angle θ of the pedal 28 is larger than the full-opening-time rotational angle $\theta_A$, the output difference G6, which is computed at the ECU 49 with the equation (12), is smaller than zero. When the computed output difference G6 is equal to or smaller than the second threshold value LV, the ECU 49 determines that the sensed rotational angle θ of the pedal 28 is abnormal.

In the accelerator apparatus of the sixth embodiment, the rotational angle θ of the pedal 28 is determined to be abnormal when the output difference G6, which is computed at the ECU 49, is equal to or smaller than the second threshold value LV. In this way, the accelerator apparatus of the sixth embodiment achieves the advantages, which are similar to those of the second embodiment.

Now, modifications of the above embodiments will be described.

(A) In the first and third embodiments, when the rotational angle θ of the pedal 28 is equal to or larger than the angle of zero degrees and is equal to or smaller than the predetermined rotational angle $\theta_B$, the first voltage is set to be twice larger than the second voltage. Furthermore, in the fifth embodiment, when the rotational angle θ of the pedal 28 is equal to or larger than the angle of zero degrees and is equal to or smaller than the full-opening-time rotational angle $\theta_A$, the first voltage is set to be twice larger than the second voltage. Furthermore, in the second and fourth embodiments, when the rotational angle θ of the pedal 28 is equal to or larger than the angle of zero degrees and is equal to or smaller than the predetermined rotational angle $\theta_B$, the first voltage is set to be larger than the second voltage by the predetermined value (e.g., the given value α). Furthermore, in the sixth embodiment, when the rotational angle θ of the pedal 28 is equal to or larger than the angle of zero degrees and is equal to or smaller than the full-opening-time rotational angle $\theta_A$, the first voltage is set to be larger than the second voltage by the predetermined value (e.g., the given value α). However, the relationship between the first voltage and the second voltage is not limited to the ones discussed above.

(B) In the first and second embodiments, when the rotational angle θ of the pedal 28 is larger than the predetermined rotational angle $\theta_B$, the first voltage is set to be the predetermined constant value. Furthermore, in the third and fourth embodiments, when the rotational angle θ of the pedal 28 is larger than the predetermined rotational angle $\theta_B$, the first voltage is reduced in response to the increase in the rotational angle θ of the pedal 28. Furthermore, in the fifth and sixth embodiments, when the rotational angle θ of the pedal 28 is larger than the full-opening-time rotational angle $\theta_A$, the first voltage is set to be the predetermined constant value. However, when the rotational angle θ of the pedal 28 is larger than the predetermined rotational angle $\theta_B$ or the full-opening-time rotational angle $\theta_A$, the value of the first voltage is not limited to the above described ones. When the rotational angle θ of the pedal 28 is larger than the predetermined rotational angle $\theta_B$ or the full-opening-time rotational angle $\theta_A$, the first voltage may become larger than the value, which is computed with "the predetermined condition."

(C) In the above embodiments, when the output difference is equal to or smaller than the second threshold value, the ECU determines that the sensed rotational angle θ of the pedal 28 is abnormal. However, the case, in which the ECU determines the abnormality of the pedal, is not limited to this. For instance, when the output difference is equal to or larger than the first threshold value, the ECU may determine that the rotational angle of the pedal is abnormal. In such a case, for example, although the ECU changes the first voltage according to the rotational angle of the pedal, the ECU outputs a different value, which is different from the predetermined constant value or the value computed with "the predetermined condition", as the second voltage in the state where the rotational angle θ of the pedal 28 is larger than the predetermined rotational angle $\theta_B$ or the full-opening-time rotational angle $\theta_A$.

(D) In the above embodiments, when the rotational angle of the pedal is normal, the output difference is set to be zero. However, the output difference at the state, in which the rotational angle of the pedal is normal, is not limited to this. When the rotational angle of the pedal is normal, it is only required to set the output difference in the range between the first threshold value and the second threshold value. Furthermore, each of the first threshold value and the second threshold value can be set to any value.

(E) In the first and second embodiments, when the rotational angle θ of the pedal 28 is larger than the predetermined rotational angle $\theta_B$, the first voltage is set to be the predetermined constant value. Furthermore, in the third and fourth embodiments, when the rotational angle θ of the pedal 28 is larger than the predetermined rotational angle $\theta_B$, the first voltage is reduced. Furthermore, in the fifth and sixth embodiments, when the rotational angle θ of the pedal 28 is larger than the full-opening-time rotational angle $\theta_A$, the first voltage is reduced. However, the voltage, which is set to be the predetermined constant value or is reduced, is not limited to the first voltage. When the rotational angle θ of the pedal 28 is larger than the predetermined rotational angle $\theta_B$ or the full-opening-time rotational angle $\theta_A$, the second voltage may be set to a value, which is different from the value computed with "the predetermined condition", instead of setting the first voltage.

(F) In the above embodiments, the accelerator apparatus has the two Hall ICs. However, the number of the Hall ICs provided in the accelerator apparatus, is not limited to two. For, instance, the number of the Hall ICs provided in the accelerator apparatus may be three or larger than three.

(G) In the above embodiments, the magnets are provided in the sensor receiving recess of the shaft through the yoke. Alternatively, the magnets may be provided in the manipulation member, which is rotated integrally with the shaft.

The present disclosure is not limited to the above embodiments, and the above embodiments may be modified within the spirit and scope of the present disclosure.

What is claimed is:

1. An accelerator apparatus for a vehicle, comprising:
a support member that is installable to a body of the vehicle;
a shaft that is rotatably supported by the support member;
a manipulation member that is fixed to an outer peripheral wall of the shaft and is rotatable integrally with the shaft;
an urging device that urges the shaft to rotate the shaft in an accelerator closing direction;
a magnetic field generating device that is installed to one of the shaft and the manipulation member;
a plurality of magnetic field sensing devices, each of which outputs a voltage, which corresponds to a change in a density of a magnetic flux that occurs at a time of rotating the magnetic field generating device relative to the plurality of magnetic field sensing devices; and
an abnormality determining device that determines whether a sensed rotational angle of the magnetic field generating device relative to the plurality of magnetic field sensing devices is abnormal based on the voltages, which are outputted from the plurality of magnetic field sensing devices, wherein:
a relationship between the voltage, which is outputted from one of the plurality of magnetic field sensing devices, and the voltage, which is outputted from another one of the plurality of magnetic field sensing devices, satisfies a predetermined condition when the sensed rotational angle of the magnetic field generating device relative to the plurality of magnetic field sensing devices is in a range from a full-closing-time rotational angle, which is a rotational angle of the magnetic field generating device relative to the plurality of magnetic field sensing devices at an accelerator-full-closing time, to a predetermined rotational angle that is positioned on one side of a full-opening-time rotational angle, which is opposite from the full-closing time rotational angle in an accelerator opening direction, wherein the full-opening-time rotational angle is a rotational angle of the magnetic field generating device relative to the plurality of magnetic field sensing devices at an accelerator-full-opening time;
the one of the plurality of magnetic field sensing devices outputs the voltage, which is different from a voltage of the one of the magnetic field sensing devices computed according to the predetermined condition, when the sensed rotational angle of the magnetic field generating device relative to the plurality of magnetic field sensing devices is on one side of the predetermined rotational angle, which is opposite from the full-opening-time rotational angle in the accelerator opening direction; and
the abnormality determining device determines that the sensed rotational angle of the magnetic field generating device relative to the plurality of magnetic field sensing devices is abnormal when a voltage difference, which is computed based on the voltage outputted from the one of the plurality of magnetic field sensing devices and the voltage outputted from the another one of the plurality of magnetic field sensing devices, is equal to or larger than a first threshold value or is equal to or smaller than a second threshold value, wherein the second threshold value is smaller than the first threshold value.

2. The accelerator apparatus according to claim 1, wherein the voltage, which is outputted from the one of the plurality of magnetic field sensing devices, is a predetermined constant voltage when the sensed rotational angle of the magnetic field generating device relative to the plurality of magnetic field sensing devices is on the one side of the predetermined rotational angle, which is opposite from the full-opening-time rotational angle in the accelerator opening direction.

3. The accelerator apparatus according to claim 1, wherein the predetermined condition is expressed by:

$$V_A = V_B \times 2$$

where
$V_A$ denotes the voltage outputted from the one of the plurality of magnetic field sensing devices, and
$V_B$ denotes the voltage outputted from the another one of the plurality of magnetic field sensing devices.

4. The accelerator apparatus according to claim 1, wherein the predetermined condition is expressed by:

$$V_A = V_B + \alpha$$

where
$V_A$ denotes the voltage outputted from the one of the plurality of magnetic field sensing devices,
$V_B$ denotes the voltage outputted from the another one of the plurality of magnetic field sensing devices, and
$\alpha$ denotes a constant.

5. An accelerator apparatus for a vehicle, comprising:
a support member that is installable to a body of the vehicle;
a shaft that is rotatably supported by the support member;
a manipulation member that is fixed to an outer peripheral wall of the shaft and is rotatable integrally with the shaft;
an urging device that urges the shaft to rotate the shaft in an accelerator closing direction;
a magnetic field generating device that is installed to one of the shaft and the manipulation member;
a plurality of magnetic field sensing devices, each of which outputs a voltage, which corresponds to a change in a density of a magnetic flux that occurs at a time of rotating the magnetic field generating device relative to the plurality of magnetic field sensing devices; and
an abnormality determining device that determines whether a sensed rotational angle of the magnetic field generating device relative to the plurality of magnetic field sensing devices is abnormal based on the voltages, which are outputted from the plurality of magnetic field sensing devices, wherein:
a relationship between the voltage, which is outputted from one of the plurality of magnetic field sensing devices, and the voltage, which is outputted from another one of the plurality of magnetic field sensing devices, satisfies a predetermined condition when the sensed rotational angle of the magnetic field generating device relative to the plurality of magnetic field sensing devices is in a range from a full-closing-time rotational angle, which is a rotational angle of the magnetic field generating device relative to the plurality of magnetic field sensing devices at an accelerator-full-closing time, to a full-opening-time rotational angle, which is a rotational angle of the magnetic field generating device relative to the plurality of magnetic field sensing devices at an accelerator-full-opening time;
the one of the plurality of magnetic field sensing devices outputs the voltage, which is different from a voltage of the one of the magnetic field sensing devices computed according to the predetermined condition, when the sensed rotational angle of the magnetic field generating device relative to the plurality of magnetic field sensing devices is on one side of the full-opening-time rotational angle, which is opposite from the full-closing-time rotational angle in an accelerator opening direction; and the abnormality determining device determines that the sensed rotational angle of the magnetic field generating device relative to the plurality of magnetic field sensing devices is abnormal when a voltage difference, which is computed based on the voltage outputted from the one of the plurality of magnetic field sensing devices and the voltage outputted from the another one of the plurality of magnetic field sensing devices, is equal to or larger than a first threshold value or is equal to or smaller than a second threshold value, wherein the second threshold value is smaller than the first threshold value.

6. The accelerator apparatus according to claim 5, wherein the voltage, which is outputted from the one of the plurality of magnetic field sensing devices, is a predetermined constant voltage when the sensed rotational angle of the magnetic field generating device relative to the plurality of magnetic field sensing devices is on the one side of the full-opening-time rotational angle, which is opposite from the full-closing-time rotational angle in the accelerator opening direction.

7. The accelerator apparatus according to claim 5, wherein the predetermined condition is expressed by:

$$V_A = V_B \times 2$$

where
 $V_A$ denotes the voltage outputted from the one of the plurality of magnetic field sensing devices, and
 $V_B$ denotes the voltage outputted from the another one of the plurality of magnetic field sensing devices.

8. The accelerator apparatus according to claim 5, wherein the predetermined condition is expressed by:

$$V_A = V_B + \alpha$$

where
 $V_A$ denotes the voltage outputted from the one of the plurality of magnetic field sensing devices,
 $V_B$ denotes the voltage outputted from the another one of the plurality of magnetic field sensing devices, and
 $\alpha$ denotes a constant.

* * * * *